(12) United States Patent
Kass et al.

(10) Patent No.: US 7,247,383 B1
(45) Date of Patent: Jul. 24, 2007

(54) INTEGRATED SELF-CLEANING WINDOW ASSEMBLY FOR OPTICAL TRANSMISSION IN COMBUSTION ENVIRONMENTS

(75) Inventors: Michael D. Kass, Oak Ridge, TN (US); William P. Partridge, Jr., Oak Ridge, TN (US)

(73) Assignee: U.S. Department of Energy, Washington, DC (US)

(*) Notice: Subject to any disclaimer, the term of this patent is extended or adjusted under 35 U.S.C. 154(b) by 101 days.

(21) Appl. No.: 10/817,413

(22) Filed: Mar. 26, 2004

(51) Int. Cl.
*B32B 17/06* (2006.01)

(52) U.S. Cl. .................. 428/432; 428/433; 428/434; 428/697; 428/698; 428/699; 428/701; 428/702

(58) Field of Classification Search ............... 428/432, 428/433, 434, 697, 698, 699, 701, 702
See application file for complete search history.

(56) References Cited

U.S. PATENT DOCUMENTS

| | | | |
|---|---|---|---|
| 5,986,612 A | 11/1999 | Nagy | |
| 6,054,227 A * | 4/2000 | Greenberg et al. | 428/701 |
| 6,137,086 A | 10/2000 | Williams, Jr. | |
| 6,436,198 B1 | 8/2002 | Swain et al. | |
| 2003/0235720 A1 * | 12/2003 | Athey et al. | 428/702 |

\* cited by examiner

*Primary Examiner*—John J. Zimmerman
*Assistant Examiner*—G. Blackwell
(74) *Attorney, Agent, or Firm*—Esther L. Roberts; Emily G. Schneider; Paul A. Gottlieb

(57) ABSTRACT

An integrated window design for optical transmission in combustion environments is described. The invention consists of an integrated optical window design that prevents and removes the accumulation of carbon-based particulate matter and gaseous hydrocarbons through a combination of heat and catalysis. These windows will enable established optical technologies to be applied to combustion environments and their exhaust systems.

9 Claims, 20 Drawing Sheets

INTEGRATED SELF-CLEANING WINDOW ASSEMBLY FOR OPTICAL TRANSMISSION IN COMBUSTION ENVIRONMENTS

This invention relates to an integrated self-cleaning window assembly for optical transmission in combustion environments. The United States Government has rights to this invention pursuant to Contract No. DE-AC05-00OR22725 with UT-Battelle, LLC, awarded by the U.S. Department of Energy.

BACKGROUND OF THE INVENTION

Fossil and renewable energy fuels, such as oil, coal, gas and biomass, are burned or, in other words, combusted in order to produce energy. These combustible fuels may be utilized in internal combustion engines (such as spark ignited and compression ignition systems found in automobiles, trains, ships, planes, and generators), in turbine engines (used to power aircraft and ships), and in furnaces (such as burners, boilers, fluidized beds used in steam power plants).

The burning of combustible fuels to generate energy results in the generation of pollutants including CO, $CO_2$, $NO_x$ (NO and $NO_2$), particulate matter, sulfur compounds, and assorted hydrocarbons. These combustion pollutants are commonly exhausted to the atmosphere where they present a potential hazard to human health and the environment.

Monitoring of combustion processes and subsequent emissions within combustion chambers or their exhausts is extremely difficult because of the rapid build up of hydrocarbons and particulate matter on exposed surfaces within the combustion environment. It is vitally important to monitor these processes, however, in order to evaluate system parameters, optimize combustion performance, and provide feedback control, all of which are necessary to improve energy efficiency and limit pollutant emissions.

Many, if not all, of the emissions formed during combustion can be accurately and rapidly measured using standard optical methods (such as Fourier transform infrared spectroscopy and non-dispersive infrared analysis, for example). These technologies, however, require optical access to the exhaust stream of a combustion environment. Installation of a plain transparent optical access port or window into some component of the exhaust system would be futile because the build up of hydrocarbons and particulate matter would attach to and cloud the window on a frequent and regular basis. The accumulation of these contaminants on window surfaces is considered the primary barrier to the utilization of optical technologies in combustion and/or emission environments.

Most automotive emission sensors are solid-state devices that use a zirconia-based solid electrolyte to conduct oxygen atoms from one surface to the other. The response of these devices is dependent on the diffusion rate of oxygen atoms through the zirconia and this diffusion rate is limited due to the required thickness of the zirconia-based electrolyte. Because these sensors are diffusion limited, they have relatively slow time constants (>150 milliseconds) for producing data. In addition, since oxygen is the conducting medium, they are limited to the measurement of oxygen and some oxide gases (such as $NO_x$), and therefore cannot be used to directly characterize hydrocarbons and particulate matter. These sensors also have poor resolution and are unable to measure concentrations below 10 parts-per-million.

It is highly desirable to measure hydrocarbons, particulate matter, and other gaseous emissions at time constants much less than 150 milliseconds. Optical-based sensors (such as those based on infrared spectroscopy) offer high speed (time constants <<150 milliseconds) and can be used to measure a range of pollutant species (including particulates) not detectable by currently available solid state devices. As noted earlier, many optical techniques are already well established and commercially available. The barrier to realizing optical diagnostic measurements lies with the constant fouling of the optical port, or window, due to the continual buildup of hydrocarbons and particulate matter.

During coal and oil combustion, visual monitoring takes place via portals in which clean air or an inert gas (such as nitrogen or argon) is constantly directed over the portal surface to maintain visibility. In spite of this, the portals nevertheless become contaminated over time and must be periodically cleaned. Another disadvantage of this technology is that a gas supply must be constantly directed over the portal. This necessitates a storage and supply system for the inert gas. A large percentage of the cost for these systems is associated with this gas usage.

Infrared detectors contain a detector that measures the intensity of infrared radiation. They are used to determine the presence of a flame during combustion (such as in gas/oil burners). Unfortunately, these detectors can also become contaminated with hydrocarbons and particulate matter and, as a result, must be frequently replaced. In fact, the accumulation of soot and/or hydrocarbons is considered a serious safety issue, since these detectors are considered unreliable when they become dirty.

As noted earlier, neither infrared detectors nor air guard portal systems are self-cleaning. Thus the combustion system must be stopped and/or at least partially dismantled in order for either an air guard portal system or an infrared detector to be cleaned or replaced on a regular basis.

In order to achieve maximum capability for any combustion/emission sensor system, one would need to install an optical access port, or window, containing an integrated self-cleaning system, into some component of the combustion/exhaust system. The self-cleaning capability of such a window would prevent and/or remove any buildup of hydrocarbons and particulate matter and thus maintain a clear optical access, or window, through which emissions may be measured.

U.S. Pat. No. 6,173,086 to Williams shows a vehicle window assembly that includes one or more resistance heating lines for electrically heating a section of the window area corresponding to a window wiper rest area. Williams' invention, however, would not work in the exhaust stream of a combustion environment because both hydrocarbons and particulate matter adhere too strongly to a surface to be wiped clean via mechanical action. Also, precision mechanical action would be limited if not impossible inside a combustion chamber, as the intense heat and pressure would interfere with mechanical movement and would likely severely damage any wiper assembly. Further, unlike the present invention which uses no mechanical action, Williams' invention centers around mechanical action. The present invention utilizes catalysis and thermophoretic action to prevent and/or remove hydrocarbon and particulate matter accumulation and maintain a clean surface.

U.S. Pat. No. 6,436,198 to Swain shows a method and apparatus for removing polymeric coatings from optical fiber by disposing the fiber within a low pressure environment and applying sufficient heat to volatilize at least a portion of the polymeric coating. This invention is, in essence, a vacuum furnace and therefore is unsuitable for use in a combustion environment, as one cannot achieve a vacuum during combustion. While Swain's invention does employ a heating grid, the present invention utilizes heat plus catalysis and Swain's invention uses heat plus vacuum.

U.S. Pat. No. 5,986,612 to Nagy shows a vehicle window antenna, comprised of a grid of conductive frit material affixed to the inner side of a window glass in a confined area above a window heating element comprising a grid of similar material similarly affixed and covering most of the window viewing area. While Nagy's invention utilizes a heating grid, the grid is not used to clean a surface, nor does Nagy's invention offer the application of catalysis in any way.

Accordingly, a need in the art exists for an integrated self-cleaning window assembly for monitoring gaseous and particulate matter emissions in a combustion environment while simultaneously preventing and removing the accumulation of carbon-based particulate matter and hydrocarbon condensation through a combination of catalysis and/or heat.

SUMMARY OF THE INVENTION

In view of the above need, it is an object of this invention to provide an integrated self-cleaning window assembly that is capable of preventing and removing the accumulation of particulate matter and gaseous hydrocarbons through a combination of catalysis and/or heat.

It is an object of this invention to provide a device as in the above object that eliminates or reduces hydrocarbon (or other gaseous emission) condensation.

It is an object of this invention to provide a device as in the above object that provides good optical transmission into a combustion environment even at low temperatures (e.g. <400° C.).

It is an object of this invention to provide a device as in the above object that enables oxygen conduction through an element such as zirconia, if needed.

Briefly, the present invention is an integrated self-cleaning window assembly suitable for most optical applications in combustion environments. The integrated self-cleaning window assembly comprises a transparent base layer made up of any typical optically transparent material, such as quartz, for allowing photons to pass through, and a catalytic material. The catalytic material acts to prevent contaminants from adhering to, or accumulating on, the transparent base layer when the combustion environment is of sufficient temperature.

Optionally, the integrated self-cleaning window assembly may comprise a transparent base layer and a means for heating. Heating the transparent base layer offsets the tendency for contaminant particles to adhere to the transparent base layer.

Optionally, the integrated self-cleaning window assembly may include, in addition to the transparent base layer, both a catalytic material and a means for heating. By incorporating both the catalytic material and a means for heating, the self-cleaning capability of the design is greatly enhanced.

Optionally, the integrated self-cleaning window assembly may also include an oxygen conducting material for use in reducing environments.

Also provided is an exhaust system having an integrated self-cleaning window assembly therein.

Also provided is a method to monitor emission components within a combustion environment by use of an integrated self-cleaning window assembly to enable optical access to the combustion environment, comprising the steps of: providing a transparent base layer to enable viewing the exhaust stream of the combustion environment, the transparent base layer having an outer surface and an inner surface which is exposed to contaminants present in the exhaust stream of the combustion environment, providing a catalytic material to either the transparent base layer or the means for heating so that the catalytic material interacts with and repels contaminants present in the exhaust stream of the combustion environment, providing a means for heating the transparent base layer to repel contaminants present in the exhaust stream of the combustion environment, and, optionally, providing an oxygen conducting material within the transparent base layer to increase oxygen content within the exhaust stream of the combustion environment, for use in reducing environments.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE DRAWINGS

The accompanying drawings, which are incorporated in and form a part of the specification, illustrate preferred embodiments of the invention, and, together with the description, serve to explain principles of the invention.

Like reference numbers indicate identical parts.

DETAILED DESCRIPTION OF THE INVENTION

In view of the above need, a new invention, an integrated self-cleaning window assembly for optical transmission in combustion environments, was developed. The invention consists of an integrated self-cleaning window assembly suitable for most optical applications.

Figure 1:
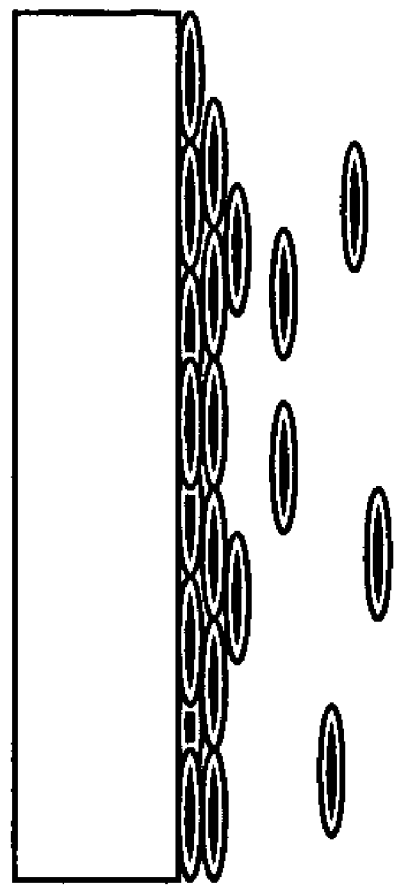
FIG. 1 is a diagram of a current state-of-the-art window assembly, illustrating how contaminants build up on the inner surface of an optical window.

As shown in FIG. 1, the current state-of-the-art window assembly does not include any means for maintaining optical access if the inner surface becomes fouled with particulate matter or hydrocarbon buildup. FIG. 1 further illustrates how hydrocarbons and particulate matter cling to and collect upon any available surface occurring during combustion within the exhaust stream. Once covered, the current state-of-the-art window assembly becomes useless for effective transmission of an emission sensor beam.

Figure 2:
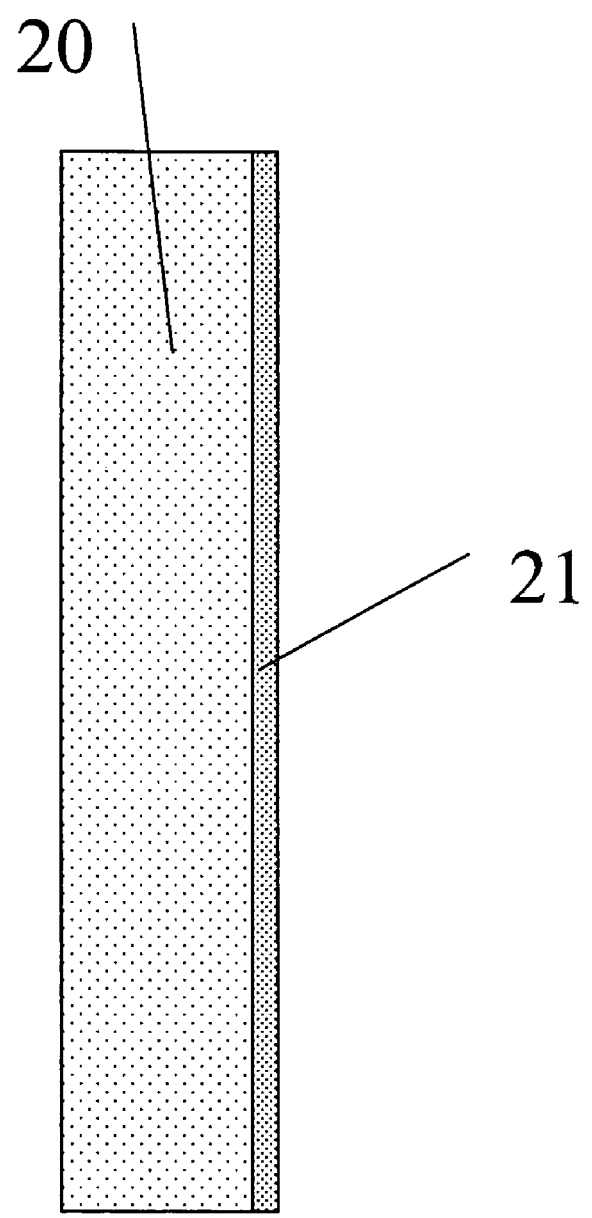
FIG. 2 is a diagram of one embodiment of an integrated self-cleaning window assembly, depicting a transparent base layer having an inner and outer surface and a catalytic material laminated onto the inner surface of the transparent base layer.

FIG. 2 illustrates one embodiment of an integrated self-cleaning window assembly. Here, the assembly includes a transparent base layer 20 having an inner and outer surface and a catalytic material 21 laminated—either continuously or in a spatially discrete manner—onto the inner surface of the transparent base layer 20. The catalytic material 21 catalyzes the contaminants in the exhaust stream and prevents contaminate formation on the transparent base layer 20. Alternatively, the catalytic material 21 may be integrated into the transparent base layer 20 (not shown).

Figure 3:
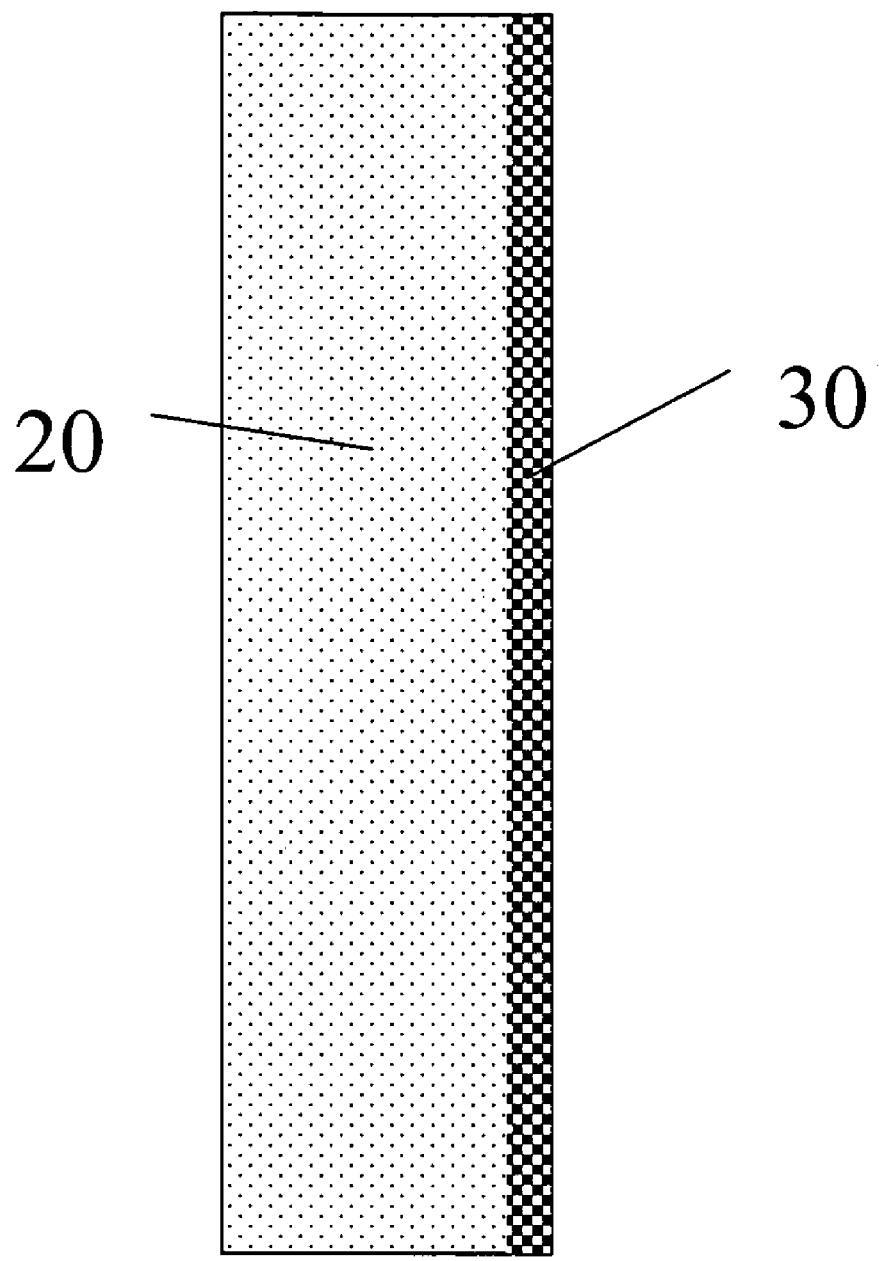
FIG. 3 is a diagram of another embodiment of an integrated self-cleaning window assembly, depicting a transparent base layer having an inner and outer surface and a means for heating laminated onto the inner surface of the transparent base layer.

FIG. 3 illustrates another embodiment of an integrated self-cleaning window assembly. Here, the assembly includes a transparent base layer 20 having an inner and outer surface and a means for heating 30 laminated onto the inner surface of the transparent base layer 20. The means for heating increases the temperature of the transparent base layer 20. This increase in temperature of the transparent base layer 20 discourages attachment upon the transparent base layer 20 by contaminants in the exhaust stream via thermophoresis. Alternatively, the means for heating 30 may be laminated onto the outer surface of the transparent base layer 20, or the means for heating 30 may be integrated into the transparent base layer 20 (not shown).

Figure 4:
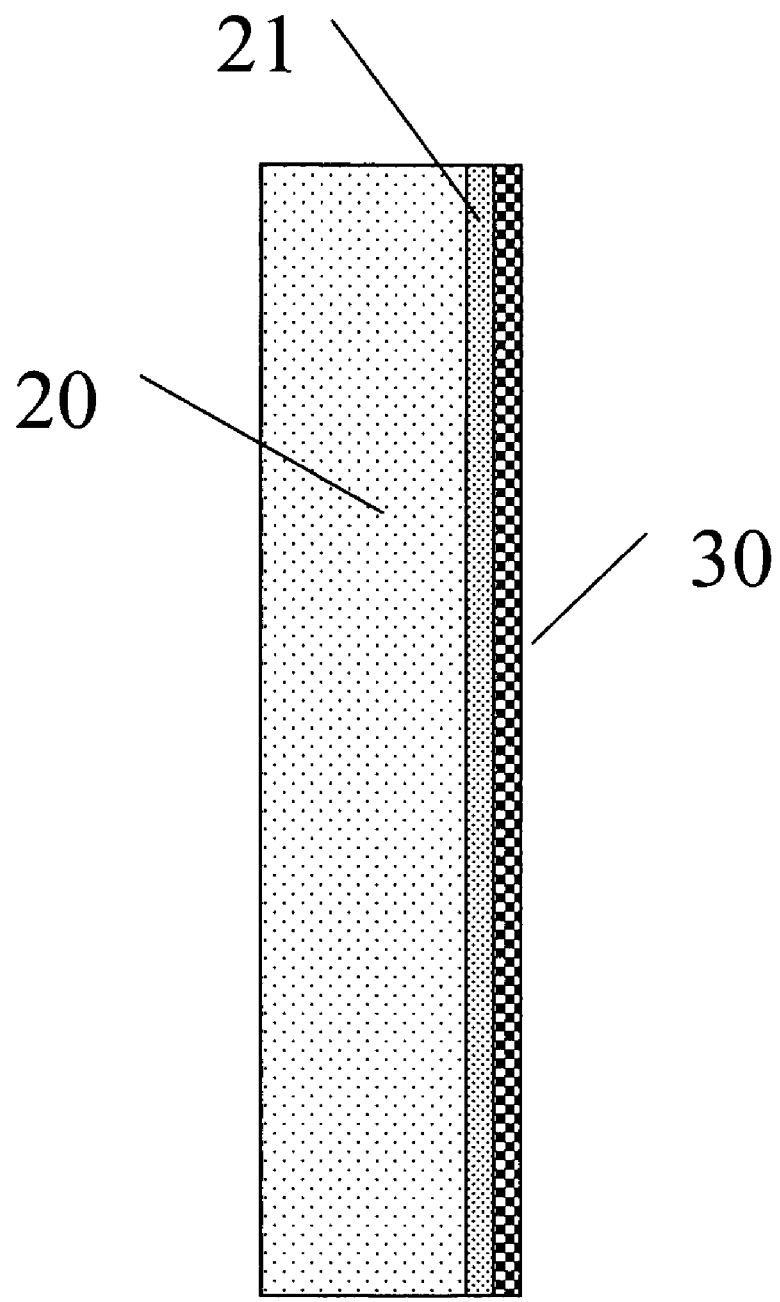
FIG. 4 is a diagram of another embodiment of an integrated self-cleaning window assembly, depicting a transparent base layer having an inner and outer surface, a catalytic material laminated onto the inner surface of the transparent base layer, and a means for heating laminated onto the inner surface of the catalytic material.

FIG. 4 illustrates another embodiment of an integrated self-cleaning window assembly. Here, the assembly includes a transparent base layer 20 having an inner and outer surface, a catalytic material 21 laminated onto the inner surface of the transparent base layer, and a means for heating 30 laminated onto the inner surface of the catalytic material. In this embodiment, the catalytic material 21 and the means for heating 30 work together to discourage attachment upon the transparent base layer 20 by contaminants in the exhaust stream. Alternatively, the catalytic material 21 may be laminated onto the inner surface of the transparent base layer 20 and the means for heating 30 may be laminated onto the inner surface of the catalytic material 21 (not shown).

Alternatively, the means for heating 30 may be laminated onto the outer surface of the transparent base layer 20 or integrated into the transparent base layer 20 (not shown). The catalytic material 21 may be integrated into the transparent base layer 20 regardless of the placement of the means for heating 30, i.e., laminated onto the inner or outer surface of the transparent base layer 20, or integrated into the transparent base layer 20 (not shown).

Figure 5:
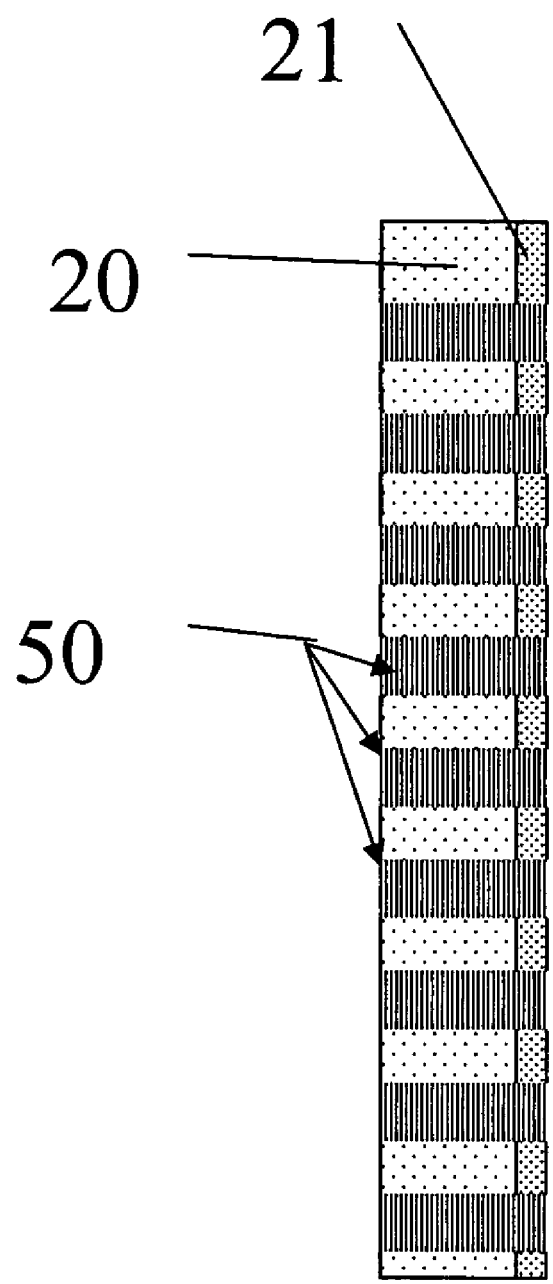
FIG. 5 is a diagram of another embodiment of an integrated self-cleaning window assembly, depicting a transparent base layer having an inner and outer surface, a catalytic material laminated onto the inner surface of the transparent base layer, and an oxygen conducting material integrated into the transparent base layer.

FIG. 5 illustrates another embodiment of an integrated self-cleaning window assembly. Here, the assembly includes a transparent base layer 20 having an inner and outer surface, a catalytic material 21 laminated onto the inner surface of the transparent base layer, and an oxygen conducting material 50 integrated into the transparent base layer

20. This embodiment would be utilized in oxygen reduction exhaust streams. Adding oxygen to an exhaust stream under reducing conditions discourages attachment upon the transparent base layer 20 by contaminants in the exhaust stream. Alternatively, the catalytic material 21 may be integrated into the transparent base layer 20 (not shown).

Figure 6:
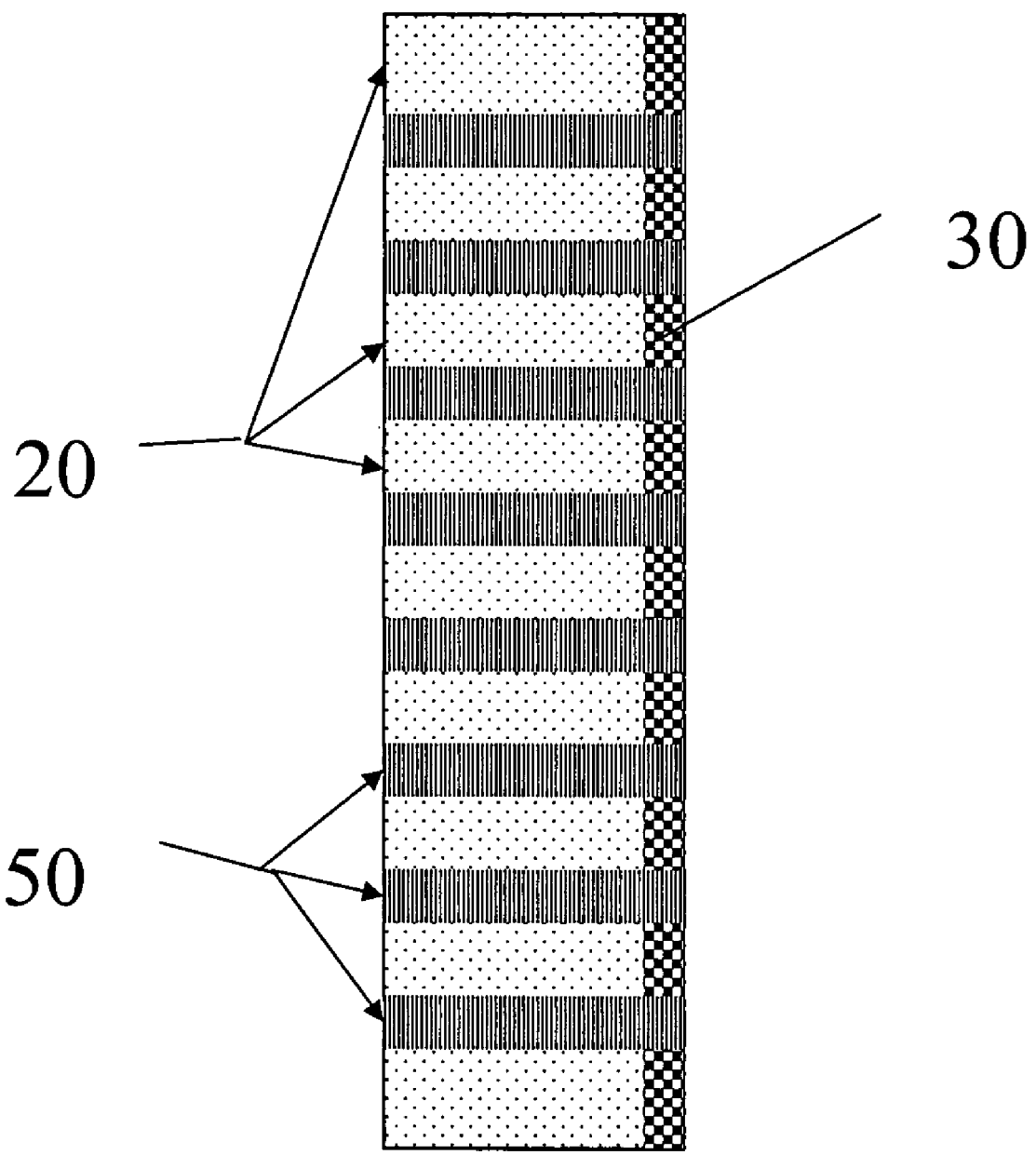
FIG. 6 is a diagram of another embodiment of an integrated self-cleaning window assembly, depicting a transparent base layer having an inner and outer surface, a means for heating laminated onto the inner surface of the transparent base layer, and an oxygen conducting material integrated into the transparent base layer.

FIG. 6 illustrates another embodiment of an integrated self-cleaning window assembly. Here, the assembly includes a transparent base layer 20 having an inner and outer surface, a means for heating 30 laminated onto the inner surface of the transparent base layer 20, and an oxygen conducting material 50 integrated into the transparent base layer 20. This embodiment would be utilized in reduced exhaust streams. Adding oxygen to a reducing exhaust stream discourages attachment upon the transparent base layer 20 by contaminants in the exhaust stream. Alternatively, the means for heating 30 may be laminated onto the outer surface of the transparent base layer 20, or the means for heating 30 may be integrated into the transparent base layer 20 (not shown).

Figure 7:
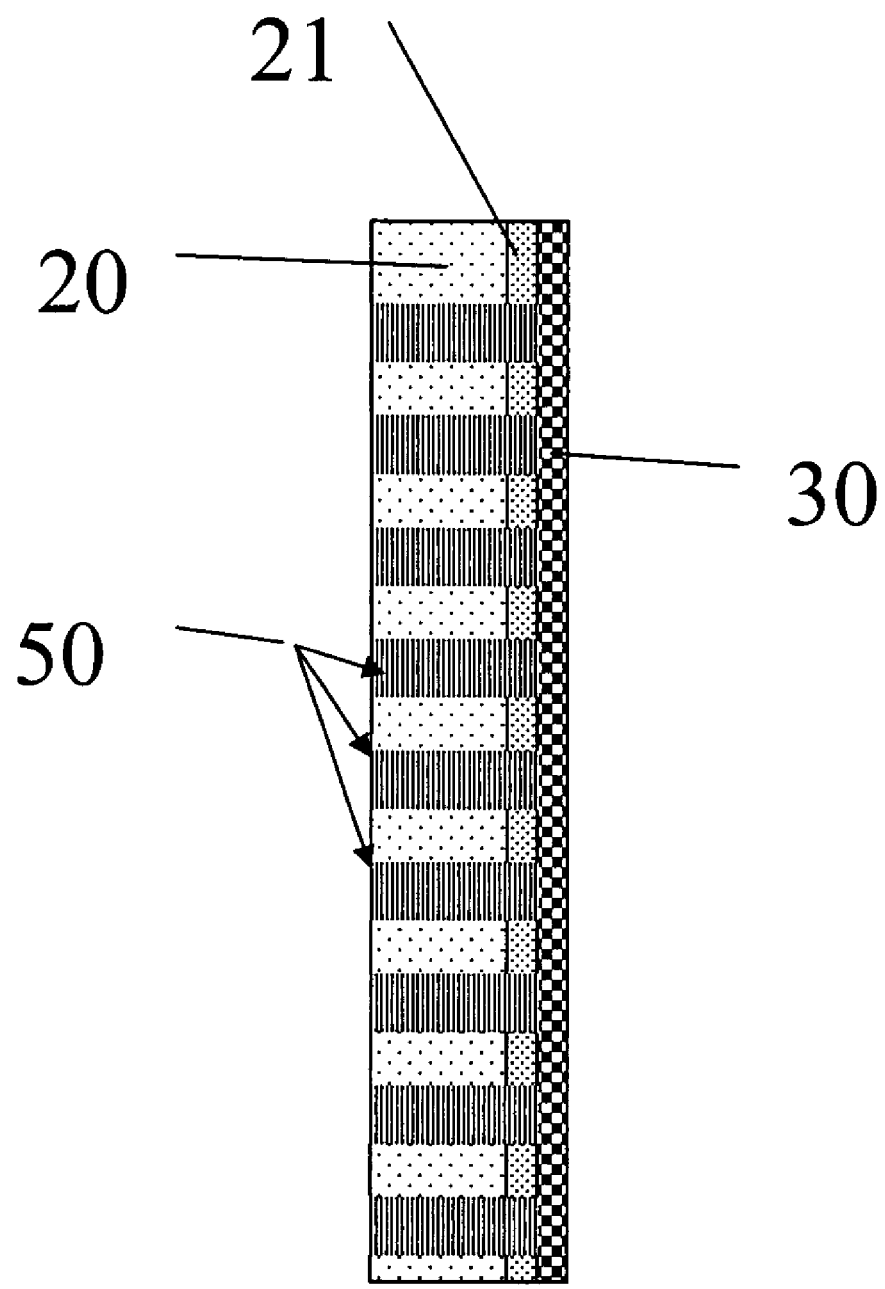
FIG. 7 is a diagram of another embodiment of an integrated self-cleaning window assembly, depicting a transparent base layer having an inner and outer surface, a catalytic material laminated onto the inner surface of the transparent base layer, a means for heating laminated onto the inner surface of the catalytic material, and an oxygen conducting material integrated into the transparent base layer.

FIG. 7 illustrates another embodiment of an integrated self-cleaning window assembly. Here, the assembly includes a transparent base layer 20 having an inner and outer surface, a catalytic material 21 laminated onto the inner surface of the transparent base layer 20, a means for heating 30 laminated onto the inner surface of the catalytic material 21, and an oxygen conducting material 50 integrated into the transparent base layer 20. This embodiment would be utilized in reducing exhaust streams. Adding oxygen to a reducing exhaust stream discourages attachment upon the transparent base layer 20 by contaminants in the exhaust stream.

Other possible embodiments include laminating the means for heating 30 onto the inner surface of the transparent base layer 20 and laminating the catalytic material 21 onto the inner surface of the means for heating 30 (not shown); laminating the catalytic material 21 onto the inner surface of the transparent base layer 20 and laminating the means for heating 30 onto the outer surface of the transparent base layer 20 (not shown); integrating the catalytic material 21 into the transparent base layer 20 and laminating the means for heating 30 onto the inner surface of the transparent base layer 20 (not shown); integrating the catalytic material 21 into the transparent base layer 20 and laminating the means for heating 30 onto the outer surface of the transparent base layer 20 (not shown); laminating the catalytic material 21 onto the inner surface of the transparent base layer 20 and integrating the means for heating 30 into the transparent base layer 20 (not shown); integrating the catalytic material 21 into the transparent base layer 20 and integrating the means for heating 30 into the transparent base layer 20 (not shown).

Figure 8:
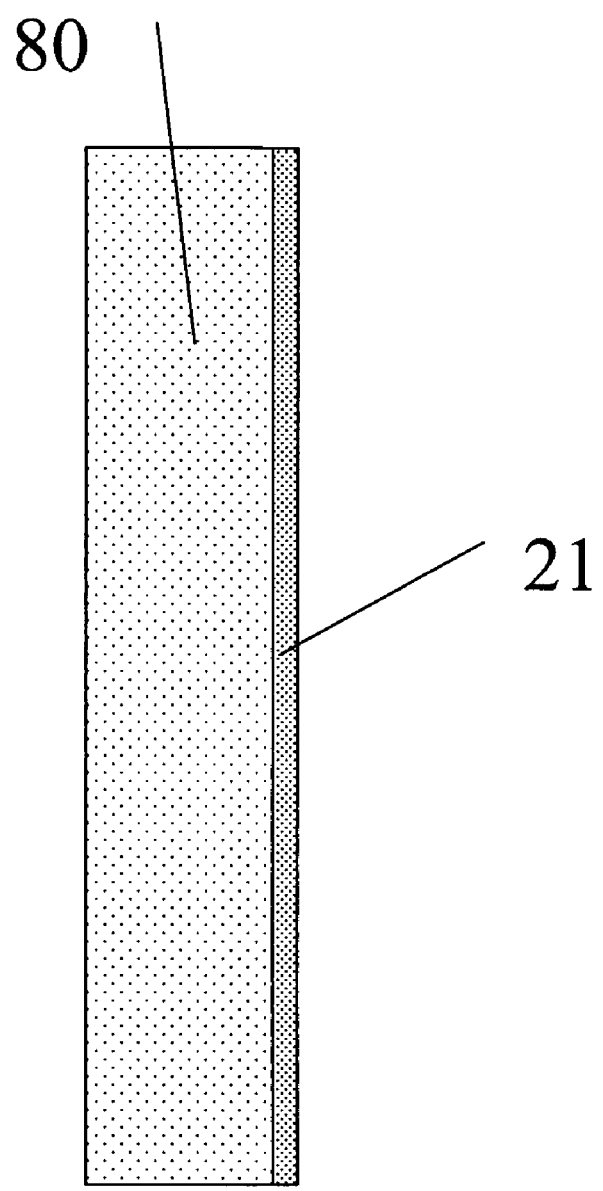
FIG. 8 is a diagram of another embodiment of an integrated self-cleaning window assembly, depicting a transparent base layer composed of an oxygen conducting material and a catalytic material laminated onto the inner surface of the transparent base layer.

FIG. 8 illustrates another embodiment of an integrated self-cleaning window assembly. Here, the assembly includes a transparent base layer 80 composed of an oxygen conducting material and a catalytic material 21 laminated onto the inner surface of the transparent base layer 80. Alternatively, the catalytic material 21 may be integrated into the transparent base layer 80 (not shown).

Figure 9:
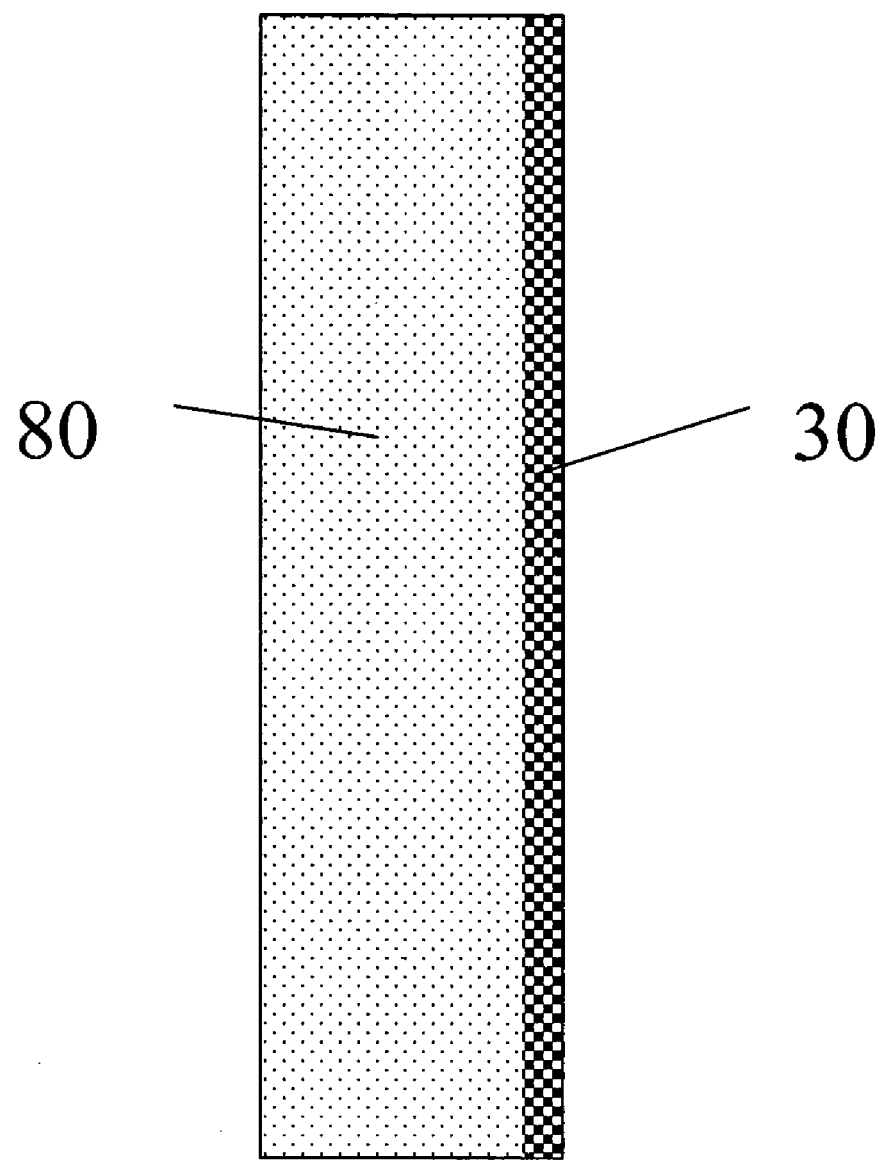
FIG. 9 is a diagram of another embodiment of an integrated self-cleaning window assembly, depicting a transparent base layer composed of an oxygen conducting material and a means for heating laminated onto the inner surface of the transparent base layer.

FIG. 9 illustrates another embodiment of an integrated self-cleaning window assembly. Here, the assembly includes a transparent base layer 80 composed of an oxygen conducting material and a means for heating 30 laminated onto the inner surface of the transparent base layer 80. Alternatively, the means for heating 30 may be either laminated onto the outer surface of the transparent base layer 80, or the means for heating 30 may be integrated into the transparent base layer 80 (not shown).

Figure 10:
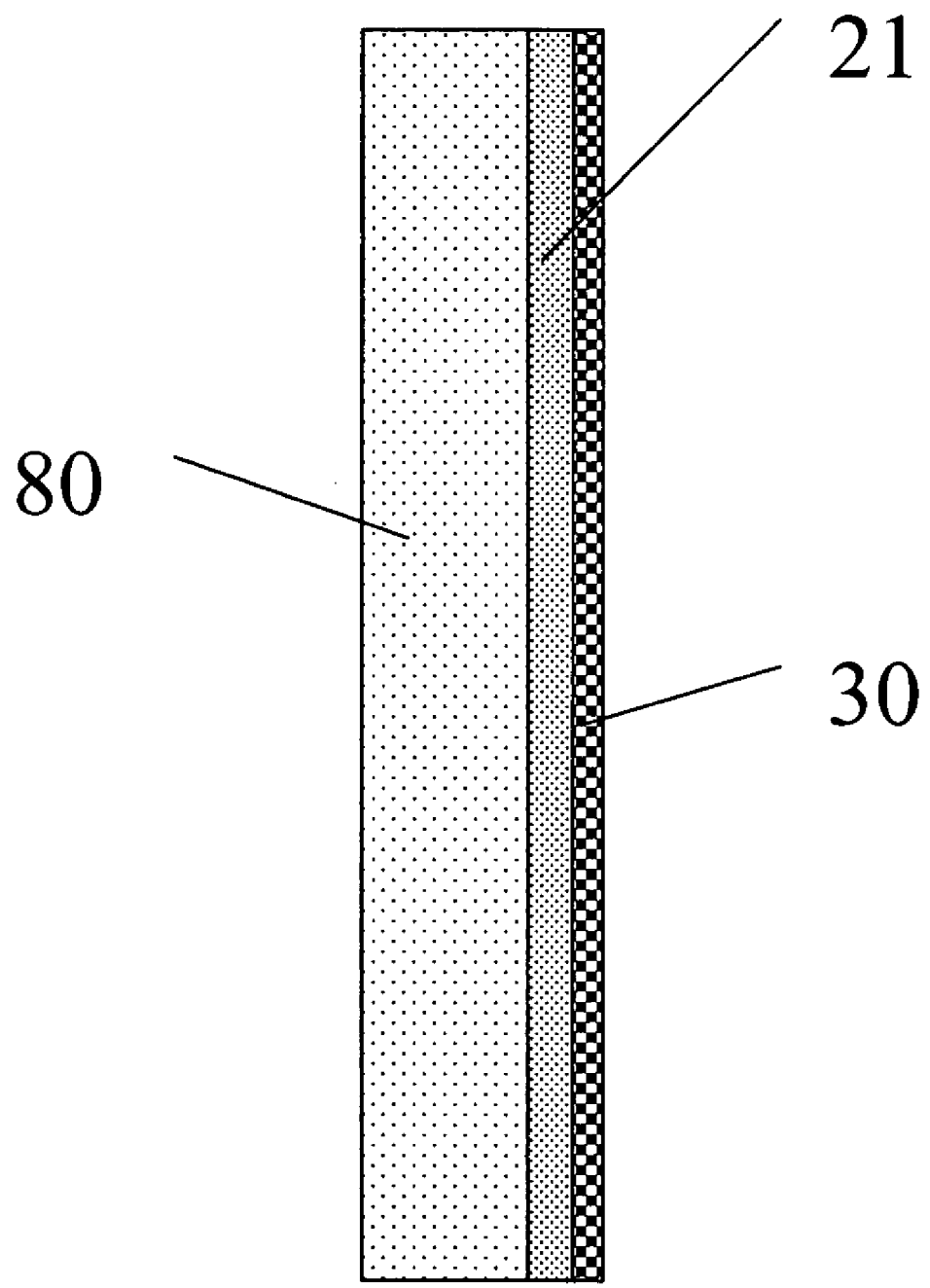
FIG. 10 is a diagram of another embodiment of an integrated self-cleaning window assembly, depicting a transparent base layer composed of an oxygen conducting material, a catalytic material laminated onto the inner surface of the transparent base layer, and a means for heating laminated onto the inner surface of the catalytic material.

FIG. 10 illustrates another embodiment of an integrated self-cleaning window assembly. Here, the assembly includes a transparent base layer 80 composed of an oxygen conducting material, a catalytic material 21 laminated onto the inner surface of the transparent base layer 80, and a means for heating 30 laminated onto the inner surface of the catalytic material 21. Alternatively, the means for heating 30 may be laminated onto the inner surface of the transparent base layer 80 and the catalytic material 21 may be laminated onto the inner surface of the means for heating 30 (not shown).

Alternate embodiments include laminating the catalytic material 21 onto the inner surface of the transparent base layer 80 and laminating the means for heating 30 onto the outer surface of the transparent base layer 80 (not shown); integrating the catalytic material 21 into the transparent base layer 80 and laminating the means for heating 30 onto the inner surface of the transparent base layer 80 (not shown); integrating the catalytic material 21 into the transparent base layer 80 and laminating the means for heating 30 onto the outer surface of the transparent base layer 80 (not shown); laminating the catalytic material 21 onto the inner surface of the transparent base layer 80 and integrating the means for heating 30 into the transparent base layer 80 (not shown); integrating the catalytic material 21 into the transparent base layer 80 and integrating the means for heating 30 into the transparent base layer 80 (not shown).

Figure 11:
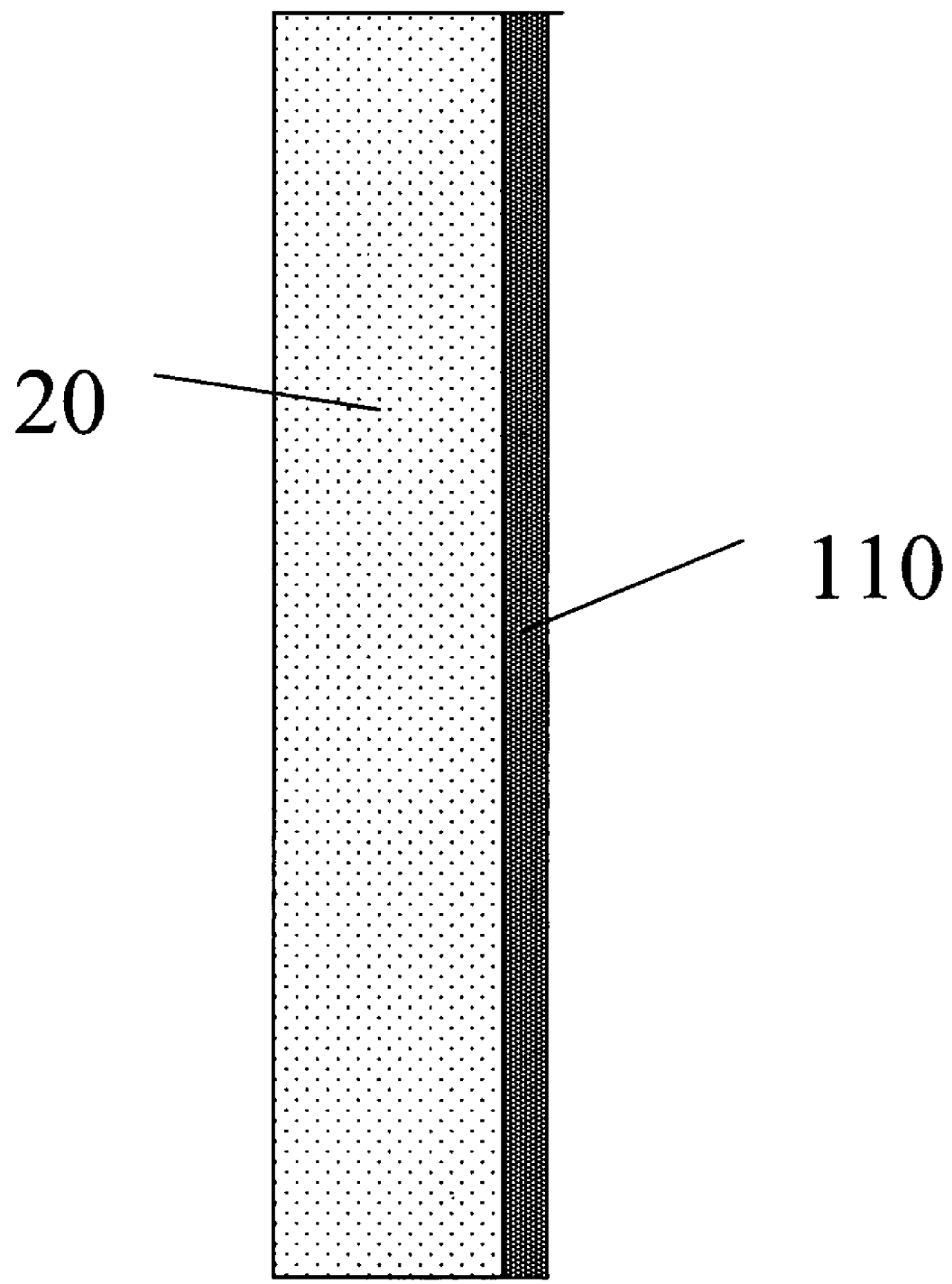
FIG. 11 is a diagram of another embodiment of an integrated self-cleaning window assembly, depicting a transparent base layer having an inner and outer surface, and a catalytic/heat transfer material laminated onto the inner surface of the transparent base layer.

FIG. 11 illustrates another embodiment of an integrated self-cleaning window assembly. Here, the assembly includes a transparent base layer 20 and a catalytic/heat transfer material 110 laminated onto the inner surface of the transparent base layer 20. Utilizing one material that acts as both catalyst and heat transfer agent may result in greater efficiency with respect to discouraging attachment upon the transparent base layer 20 by contaminants in the exhaust stream. Alternatively, the catalytic/heat transfer material 110 may be integrated into the transparent base layer 20 (not shown).

Figure 12:
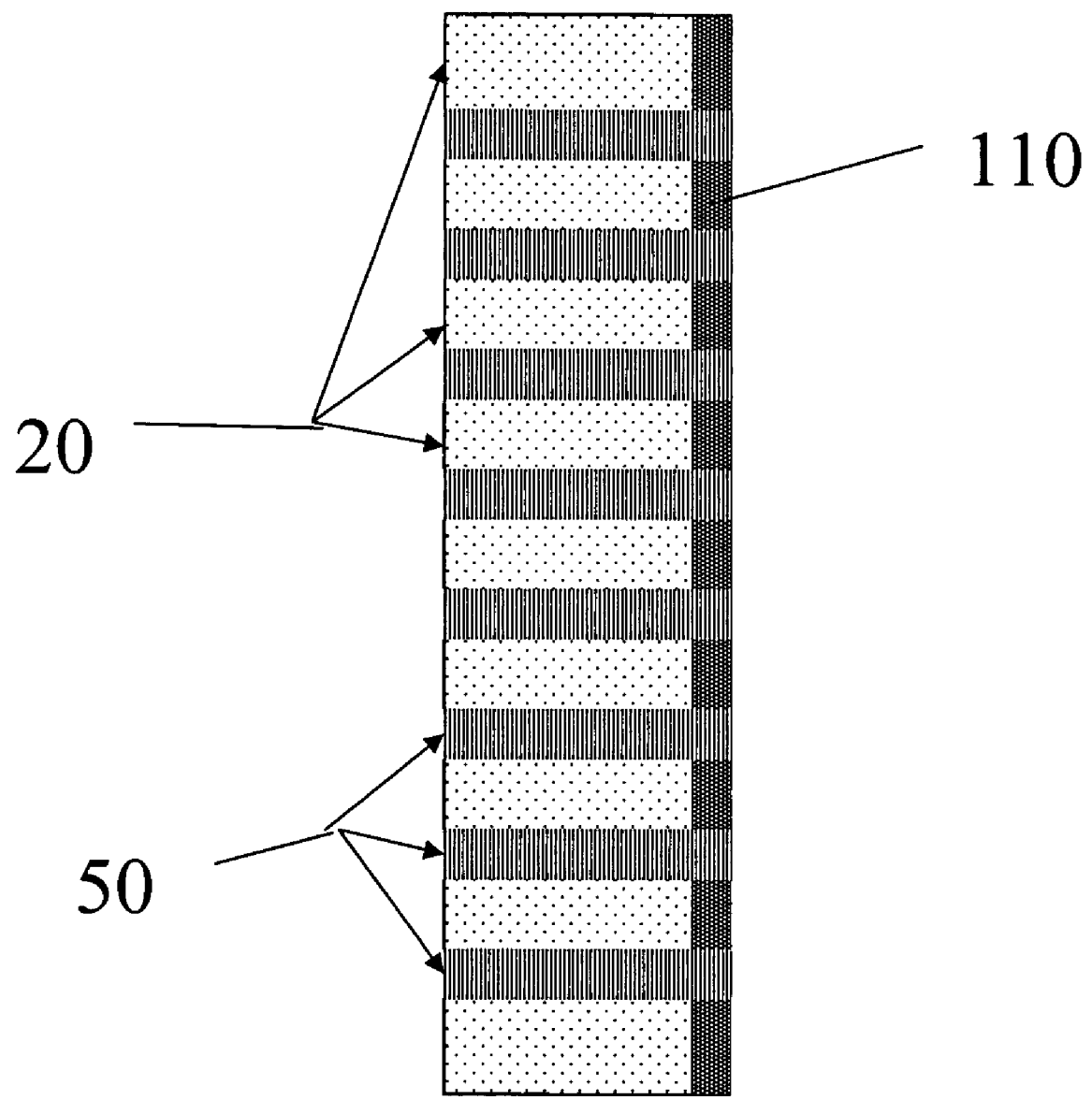
FIG. 12 is a diagram of another embodiment of an integrated self-cleaning window assembly, depicting a transparent base layer having an inner and outer surface, a catalytic/heat transfer material laminated onto the inner surface of the transparent base layer, and an oxygen conducting material integrated into the transparent base layer.

FIG. 12 illustrates another embodiment of an integrated self-cleaning window assembly. Here, the assembly includes a transparent base layer 20, a catalytic/heat transfer material 110 laminated onto the inner surface of the transparent base layer 20, and an oxygen conducting material 50 integrated into the transparent base layer 20. This embodiment would be utilized in reducing exhaust streams. Adding oxygen to a reducing exhaust stream discourages attachment upon the transparent base layer 20 by contaminants in the exhaust stream. Alternatively, the catalytic/heat transfer material 110 may be integrated into the transparent base layer 20 (not shown).

Figure 13:
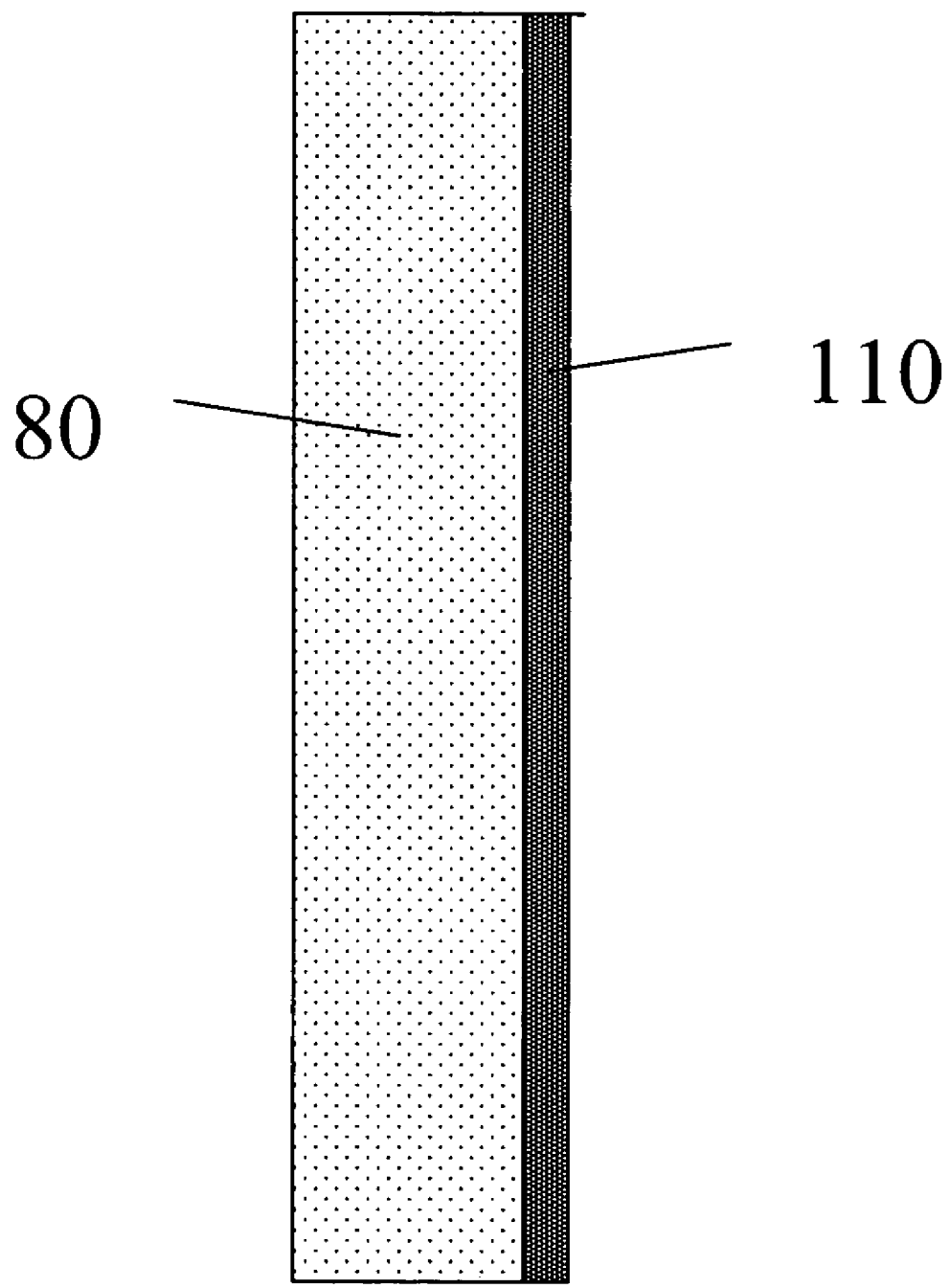
FIG. 13 is a diagram of another embodiment of an integrated self-cleaning window assembly, depicting a transparent base layer composed of an oxygen conducting material, and a catalytic/heat transfer material laminated onto the inner surface of the transparent base layer.

FIG. 13 illustrates another embodiment of an integrated self-cleaning window assembly. Here, the assembly includes a transparent base layer 80 composed of an oxygen conducting material, and a catalytic/heat transfer material 110 laminated onto the inner surface of the transparent base layer 80. Utilizing two dual-purpose materials, i.e., a transparent base layer 80 composed of an oxygen conducting material and a catalytic/heat transfer material 110, may result in greater efficiency with respect to discouraging attachment upon the transparent base layer 80 by contaminants in the exhaust stream. Alternatively, the catalytic/heat transfer material 110 may be integrated into the transparent base layer 80 (not shown).

Figure 14:
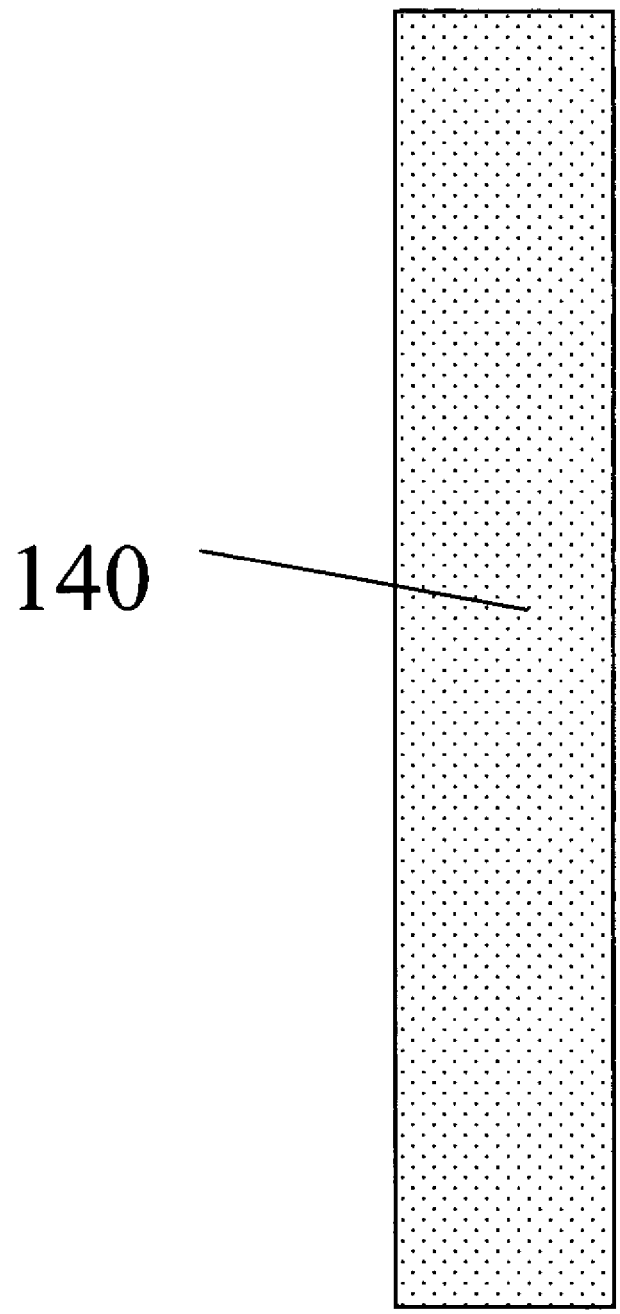
FIG. 14 is a diagram of another embodiment of an integrated self-cleaning window assembly, depicting a transparent base layer composed of a heat transfer material.

FIG. 14 illustrates another embodiment of an integrated self-cleaning window assembly. Here, the assembly includes a transparent base layer 140 composed of a heat transfer material. Utilizing one material that acts as both transparent base layer and means for heating may result in greater efficiency with respect to discouraging attachment upon the transparent base layer 140 by contaminants in the exhaust stream.

Figure 15:
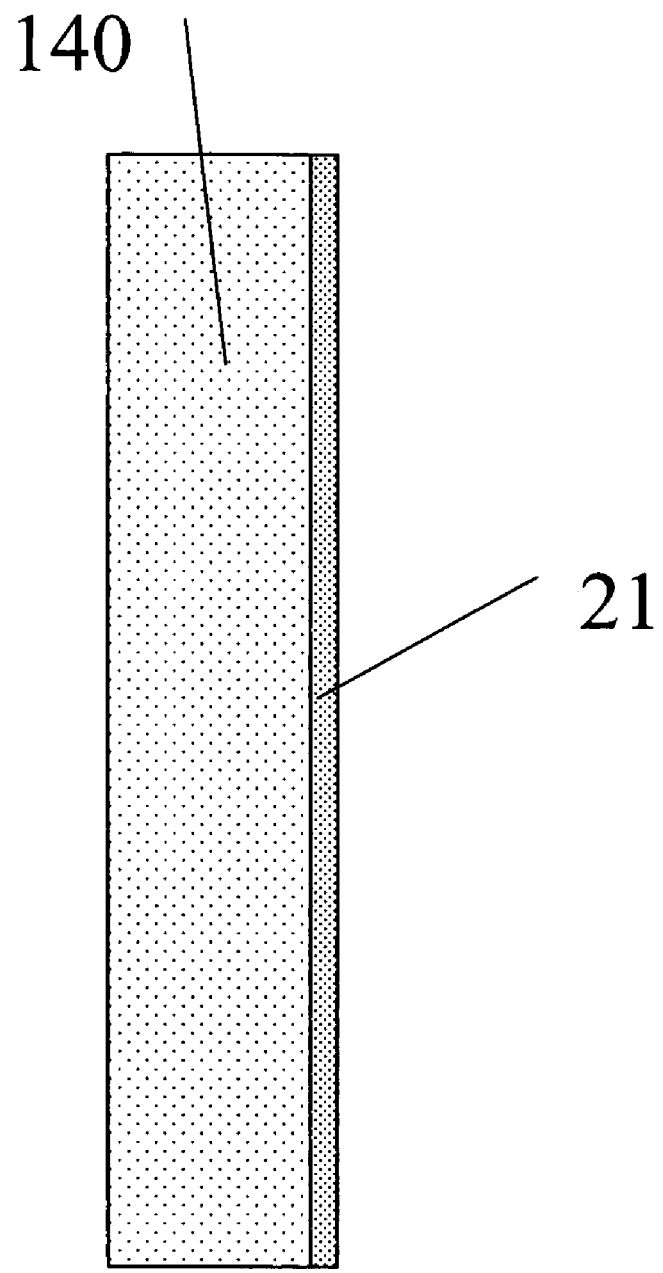
FIG. 15 is a diagram of another embodiment of an integrated self-cleaning window assembly, depicting a transparent base layer composed of a heat transfer material, and a catalytic material laminated onto the inner surface of the transparent base layer.

FIG. 15 illustrates another embodiment of an integrated self-cleaning window assembly. Here, the assembly includes a transparent base layer 140 composed of a heat transfer material, and a catalytic material 21 laminated onto the inner surface of the transparent base layer 140. Alternatively, the catalytic material 21 may be integrated into the transparent base layer 140 (not shown).

Figure 16:
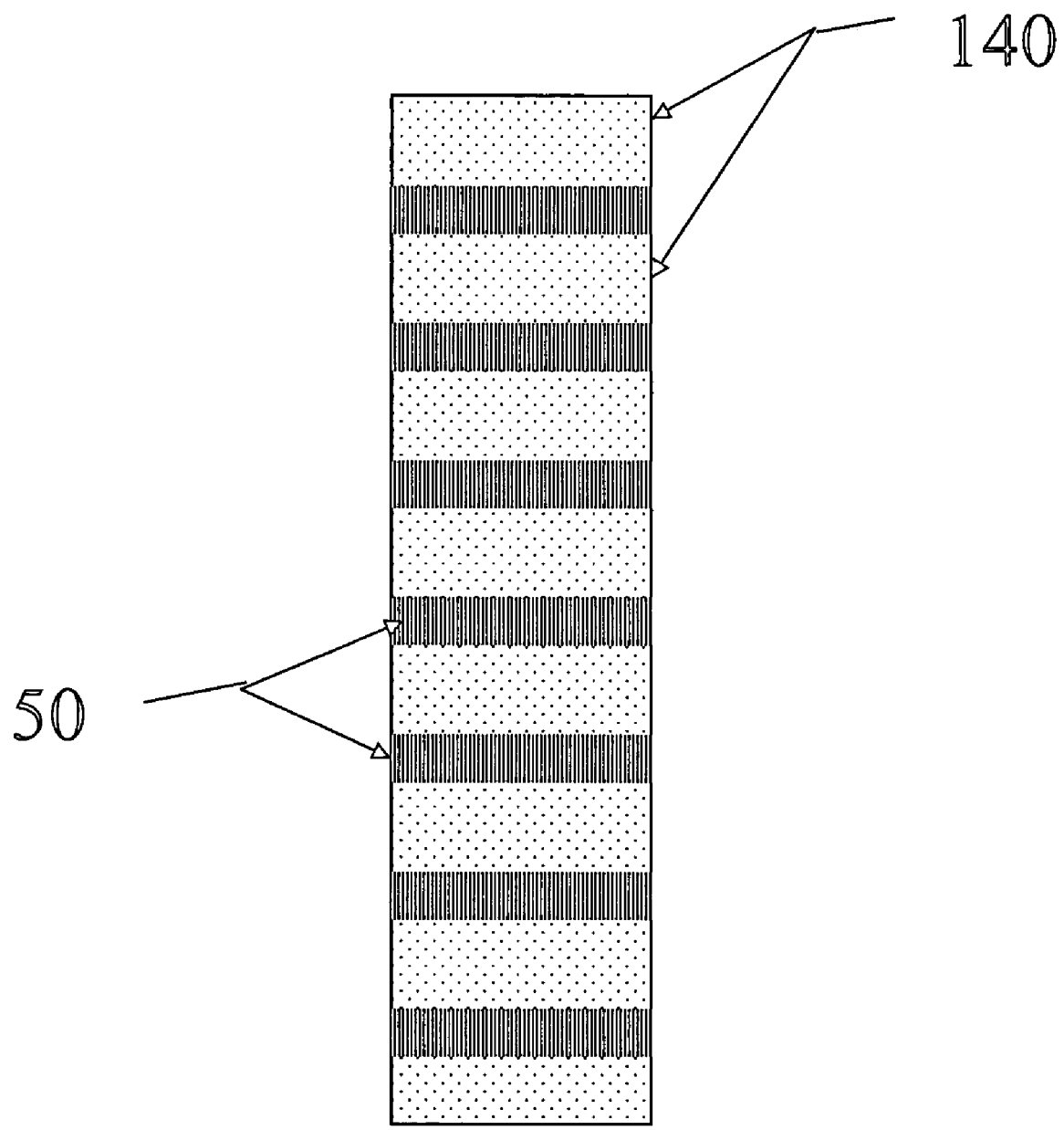
FIG. 16 is a diagram of another embodiment of an integrated self-cleaning window assembly, depicting a transparent base layer composed of a heat transfer material, and an oxygen conducting material integrated into the transparent base layer.

FIG. 16 illustrates another embodiment of an integrated self-cleaning window assembly. Here, the assembly includes a transparent base layer 140 composed of a heat transfer material, and an oxygen conducting material 50 integrated into the transparent base layer 140. This embodiment would be utilized in reducing exhaust streams. Adding oxygen to a reducing exhaust stream discourages attachment upon the transparent base layer 140 by contaminants in the exhaust stream.

Figure 17:
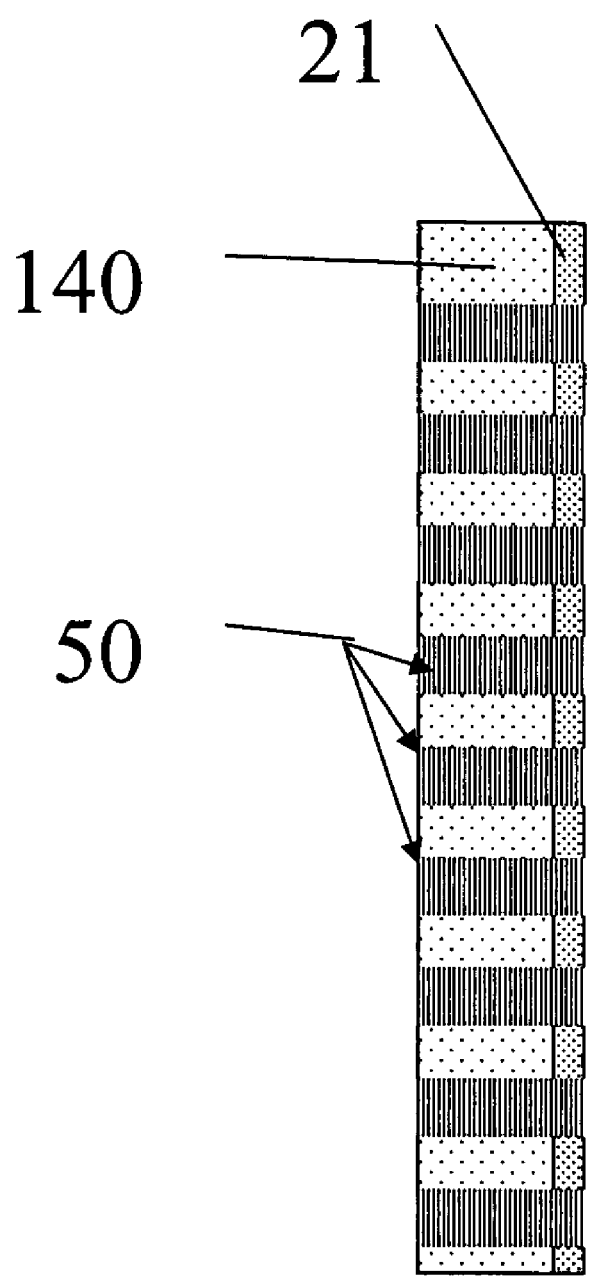
FIG. 17 is a diagram of another embodiment of an integrated self-cleaning window assembly, depicting a transparent base layer composed of a heat transfer material, a catalytic material laminated onto the inner surface of the transparent base layer, and an oxygen conducting material integrated into the transparent base layer.

FIG. 17 illustrates another embodiment of an integrated self-cleaning window assembly. Here, the assembly includes a transparent base layer 140 composed of a heat transfer material, a catalytic material 21 laminated onto the inner surface of the transparent base layer 140, and an oxygen conducting material 50 integrated into the transparent base layer 140. This embodiment would be utilized in reducing exhaust streams. Adding oxygen to a reducing exhaust stream discourages attachment upon the transparent base layer 140 by contaminants in the exhaust stream. Alternatively, the catalytic material 21 may be integrated into the transparent base layer 140 (not shown).

Figure 18:
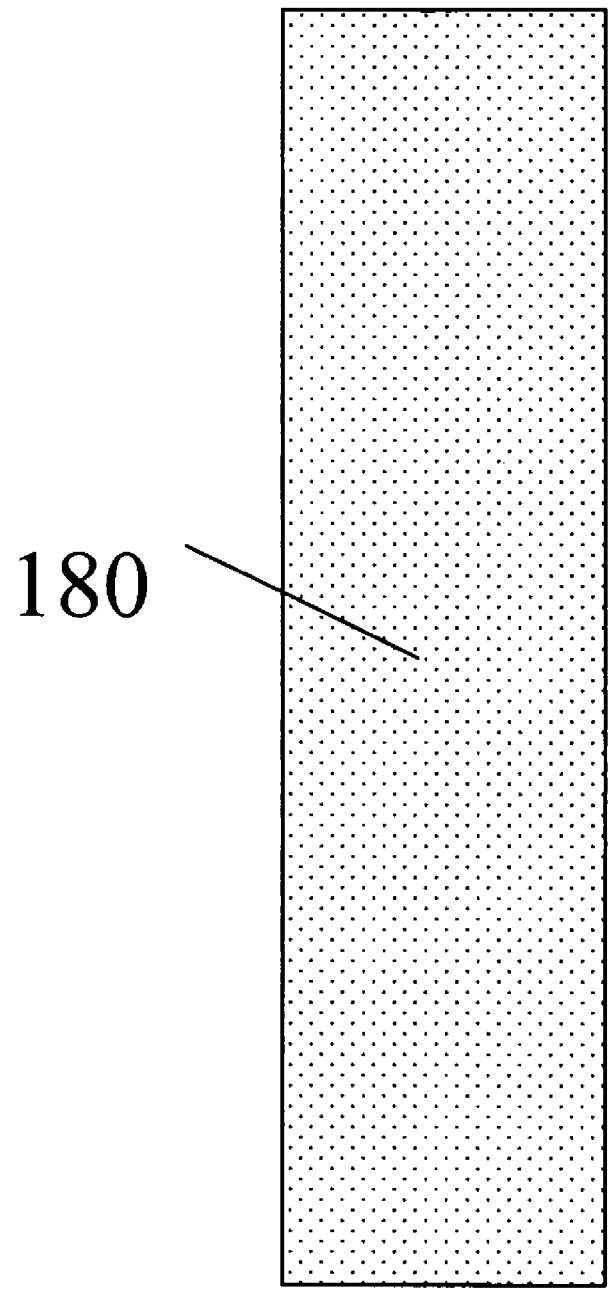
FIG. 18 is a diagram of another embodiment of an integrated self-cleaning window assembly, depicting a transparent base layer composed of a heat transfer material which also conducts oxygen.

FIG. 18 illustrates another embodiment of an integrated self-cleaning window assembly. Here, the assembly includes a transparent base layer 180 composed of a heat transfer material which also conducts oxygen. This embodiment would be utilized in reducing exhaust streams. Adding oxygen to a reducing exhaust stream discourages attachment upon the transparent base layer 180 by contaminants in the exhaust stream. Utilizing a single material which exhibits three desired characteristics of this invention, i.e., transparency for optical viewing, heat transfer to discourage attachment upon the transparent base layer 180 by contaminants in the exhaust stream, and oxygen movement into the reducing environment within the exhaust stream, may result in greater efficiency with respect to discouraging attachment upon the transparent base layer 180 by contaminants in the exhaust stream.

Figure 19:
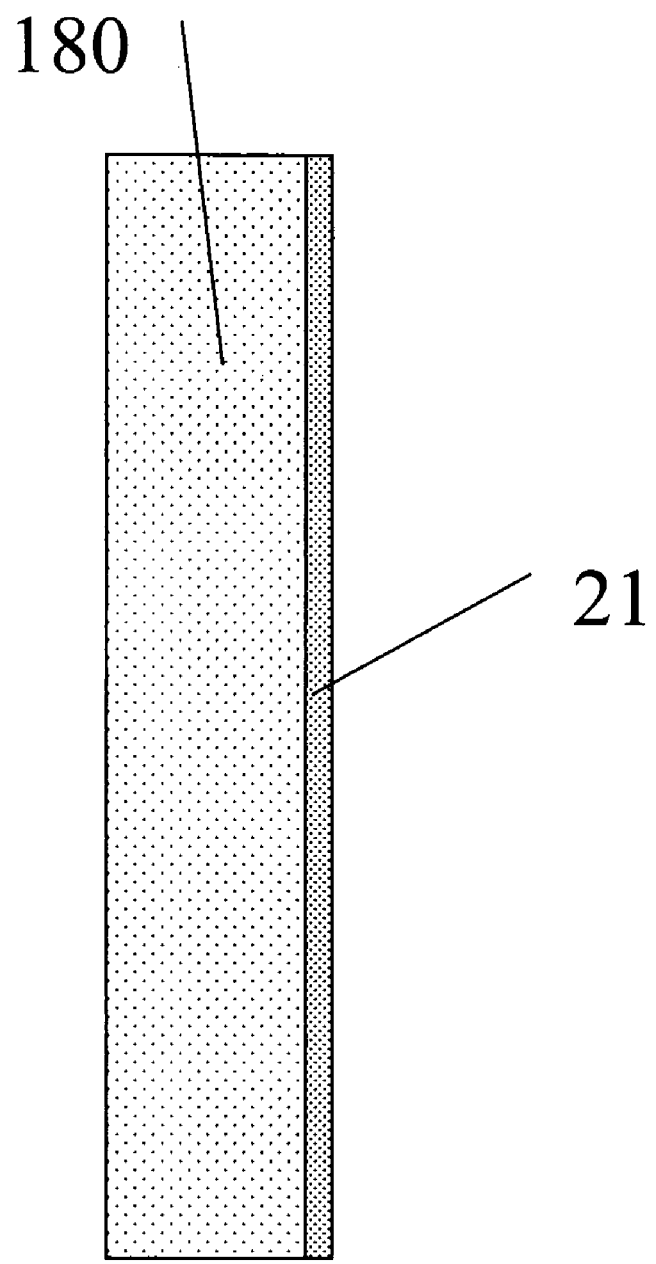
FIG. 19 is a diagram of another embodiment of an integrated self-cleaning window assembly, depicting a transparent base layer composed of a heat transfer material which also conducts oxygen, and a catalytic material laminated onto the inner surface of the transparent base layer.

FIG. 19 illustrates another embodiment of an integrated self-cleaning window assembly. Here, the assembly includes a transparent base layer 180 composed of a heat transfer material which also conducts oxygen, and a catalytic material 21 laminated onto the inner surface of the transparent base layer. Alternatively, the catalytic material 21 may be integrated into the transparent base layer 180 (not shown).

Figure 20:
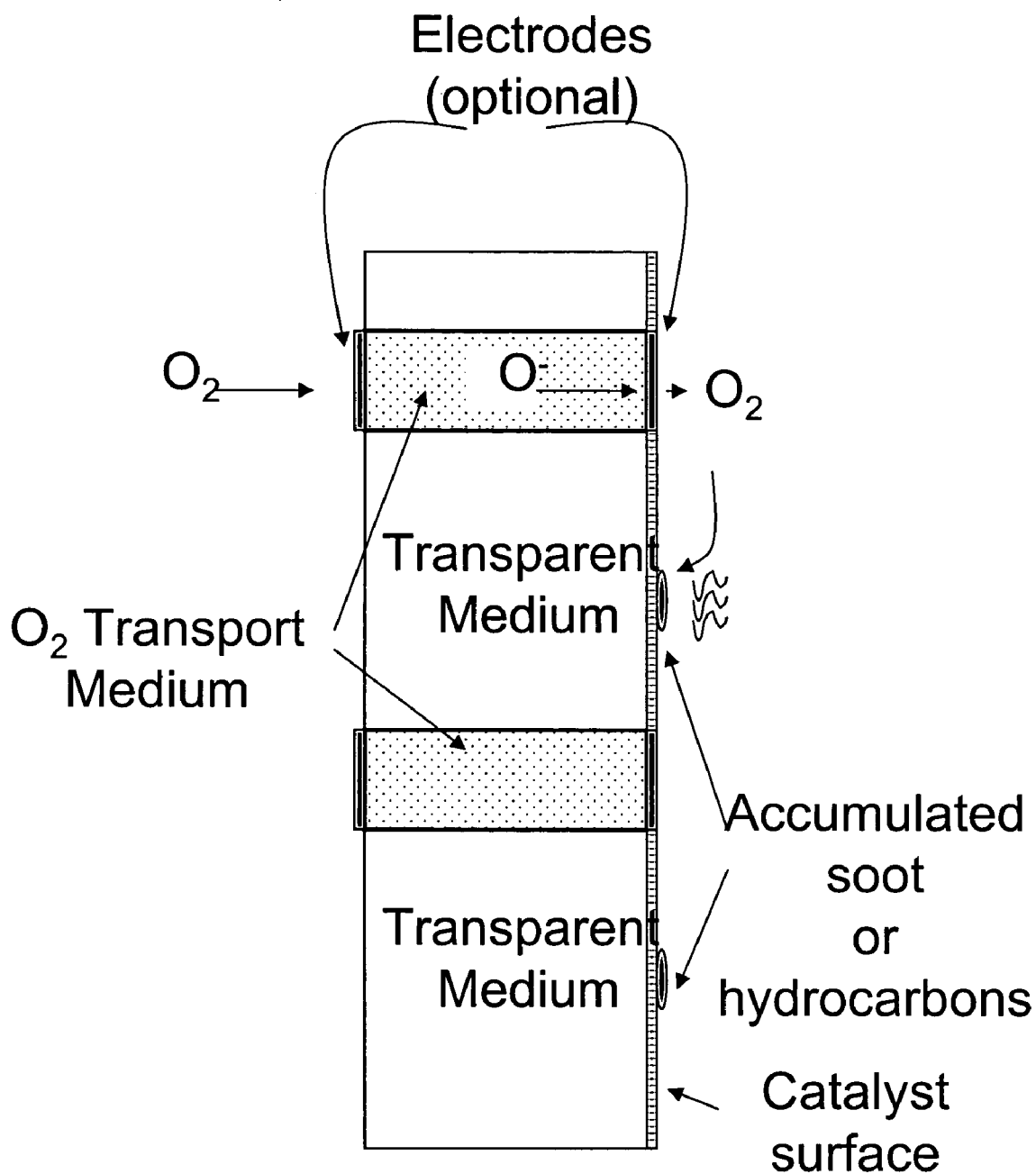
FIG. 20 illustrates how oxygen flows given an oxygen conducting material integrated into the transparent base layer.

FIG. 20 illustrates how oxygen flows given an oxygen conducting material integrated into the transparent base layer.

The transparent base layer may be made of any typical optically-transparent material, such as quartz. The type of transparent base layer optical access or "window" material depends on the optical frequency being transmitted and the particular application. Frequently, silica quartz is a good optical access material for a variety of applications, but any other transparent material, such as, but not limited to, zirconia, silicon, alumina, titania, etc., may be used as well. The window material must be selected to provide good optical access at elevated temperature, which for automotive exhaust applications may be up to 800° C.

The catalyst material of choice would be a precious metal-based catalyst, such as, but not limited to, a catalyst containing gold, silver, or platinum, or a zeolite-based catalyst. One critical aspect of this invention's successful operation is the dispersion of the catalyst. The catalytic material, whether laminated onto the transparent base layer or integrated into the transparent base layer must be of sufficient density to perform, yet still allow a sensor beam to pass through the transparent base layer at detectable levels. The catalytic material may be applied to the inner surface of the transparent base layer either as a monolayer, a dispersed coating, or as a grid. The catalytic material may also exist as an integral part of the transparent base layer.

Inclusion of a means for heating achieves the following goals. First, heat is added to the transparent base layer to mitigate transport of contaminants to the transparent base layer, based upon thermophoresis. Thermophoresis is transport driven by a temperature gradient: contaminants in a combustion environment are preferentially transported to the cooler surface which subsequently experience contaminant buildup; adding heat to the transparent base layer increases the temperature of the transparent base layer and mitigates contaminate transport to the transparent base layer. Second, heat assists the catalyst in eliminating or reducing hydrocarbon condensation by increasing the effectiveness of the catalytic driven reactions. Third, heat increases the rate of reaction of oxygen with particulate matter or hydrocarbons. Fourth, heat assists oxygen conduction through zirconia, if needed. Examples of a means for heating include, but are not limited to, electrodes, conductive materials, and exothermic chemical reactions.

For embodiments that include the oxygen conducting material, such as, but not limited to, zirconia (which may contain electrodes placed on both surfaces to facilitate oxygen conduction), the oxygen conducting medium could be integrated into the transparent base layer as columns within the substrate. When zirconia is heated to temperatures approaching 650° C., oxygen will diffuse through the zirconia from the outer surface of the transparent base layer, through the transparent base layer, and exit the inner surface of the transparent base layer into the exhaust stream of the combustion environment.

For embodiments in which the transparent base layer is composed of an oxygen conducting material, the transparent base layer acts to conduct oxygen from its outer surface through the transparent base layer. The oxygen exits at the inner surface of the transparent base layer into the exhaust stream of the combustion environment. See FIG. 20.

Thus it will be seen that an integrated self-cleaning window assembly for optical transmission in combustion environments has been provided. The invention consists of an integrated self-cleaning window assembly that prevents and removes the accumulation of carbon-based particulate matter and gaseous hydrocarbons through a combination of heat and/or catalysis. The integrated self-cleaning window assembly will enable established optical technologies to be applied to combustion environments and their exhaust systems. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A self-cleaning window assembly comprising:
   a) a transparent base layer having an inner and outer surface;
   b) a catalytic material attached to said transparent base layer, wherein said catalytic material is selected from a group consisting of: gold, silver, platinum or a zeolite; and
   c) an oxygen conducting material integral with said transparent base layer.

2. The self-cleaning window assembly as set forth in claim 1, wherein said catalytic material is comprised of zeolites.

3. A self-cleaning window assembly comprising:
   a) a transparent base layer having an inner and outer surface;
   b) a catalytic material attached to said transparent base layer, wherein said catalytic material is selected from a group consisting of gold, silver, platinum or a zeolite;
   c) a means for heating attached to said transparent base layer; and
   d) an oxygen conducting material integral with said transparent base.

4. The self-cleaning window assembly as set forth in claim 3, wherein said catalytic material is comprised of zeolites.

5. A self-cleaning window assembly comprising:
   a) a transparent base layer, comprised of an oxygen conducting material, said transparent base layer having an inner and outer surface wherein said transparent base layer is selected from a group consisting of: quartz, zirconia, silica, alumina, and titania; and
   b) a catalytic/heat transfer material, such as zirconia, attached to said transparent base layer.

6. A self-cleaning window assembly comprising:
   a) a transparent base layer, comprised of a heat transfer material, said transparent base layer having an inner and outer surface;
   b) a catalytic material attached to said transparent base layer, wherein said catalytic material is selected from a group consisting of: gold, silver, platinum or a zeolite; and
   c) an oxygen conducting material integral with said transparent base layer.

7. The self-cleaning window assembly as set forth in claim 6, wherein said catalytic material is comprised of zeolites.

8. A self-cleaning window assembly comprising:
   a) a transparent base layer, comprised of a heat transfer material which also conducts oxygen, said transparent base layer having an inner and outer surface; and
   b) a catalytic material integral with said transparent base layer wherein said catalytic material is selected from a group consisting of: gold, silver, platinum or a zeolite.

9. The self-cleaning window assembly as set forth in claim 8, wherein said catalytic material is comprised of zeolites.

* * * * *